M. LUOMA.
ANGLE INDICATOR.
APPLICATION FILED JULY 3, 1919.
1,342,335.
Patented June 1, 1920.
2 SHEETS—SHEET 1.
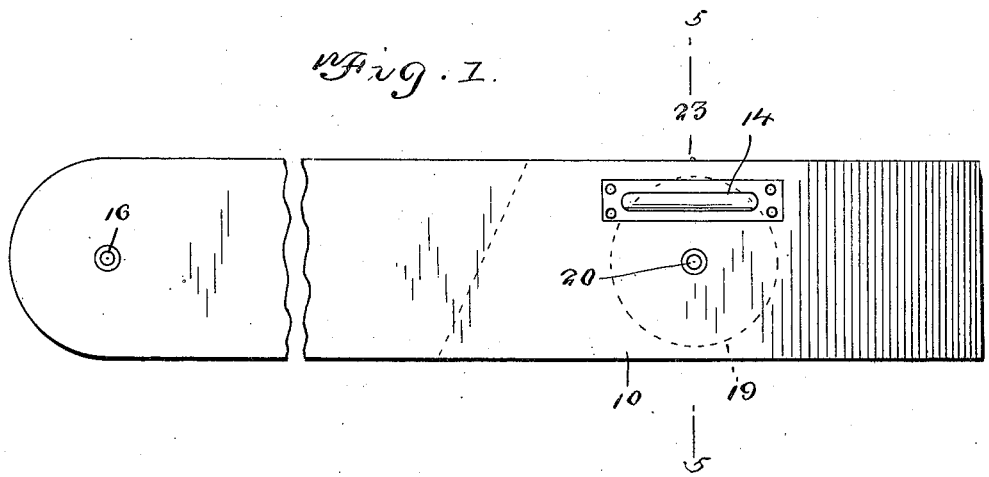
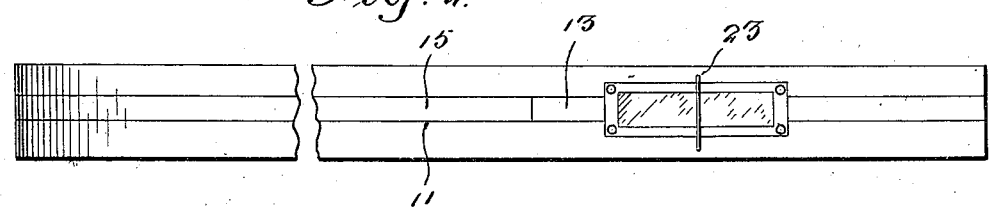
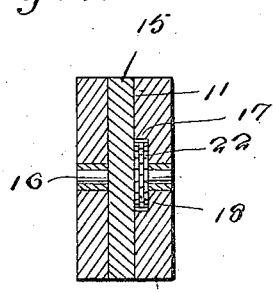
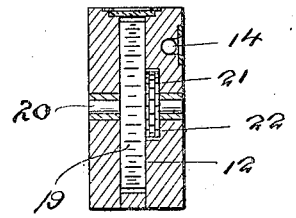
WITNESS:
E. R. Ruppert
M. Luoma
INVENTOR.
BY
Victor J. Evans
ATTORNEY.

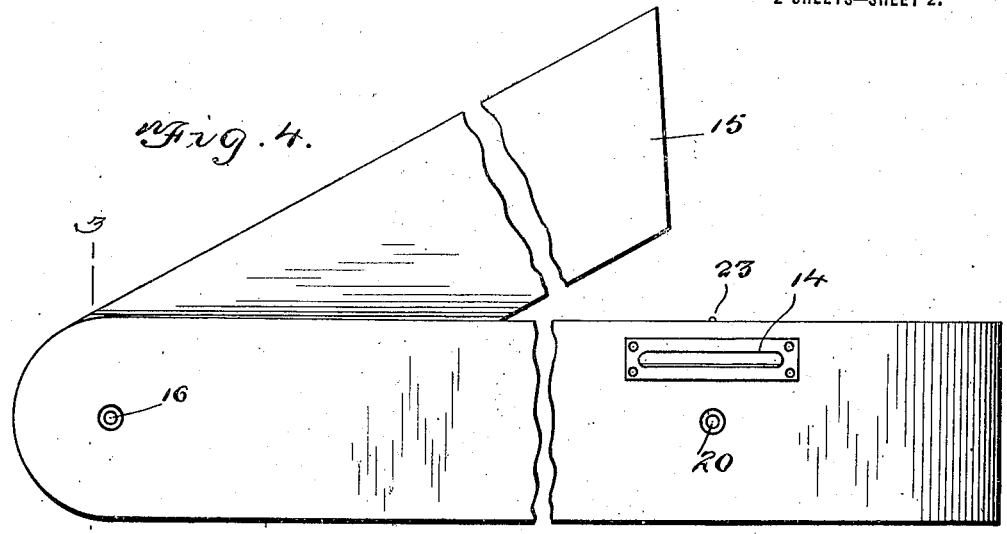
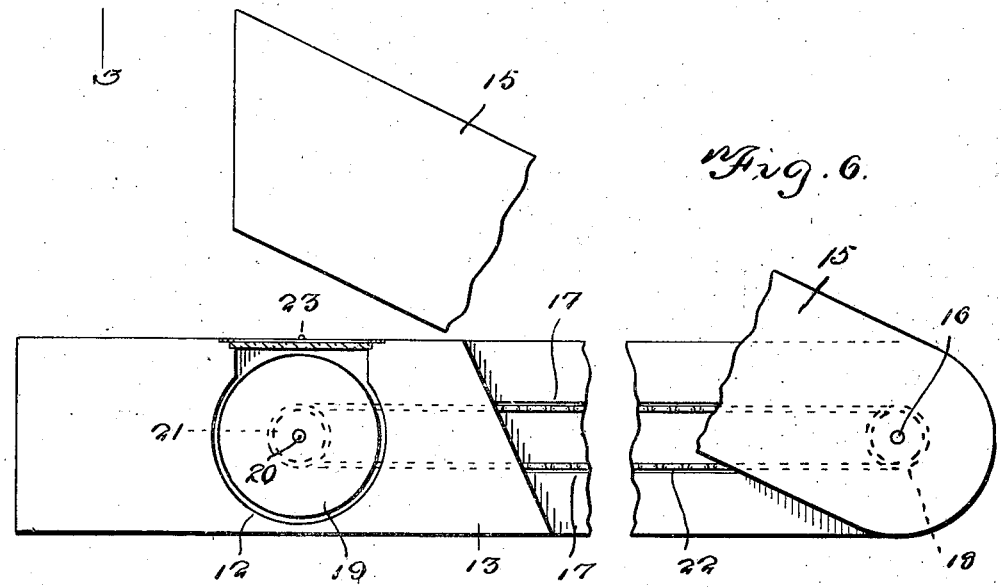
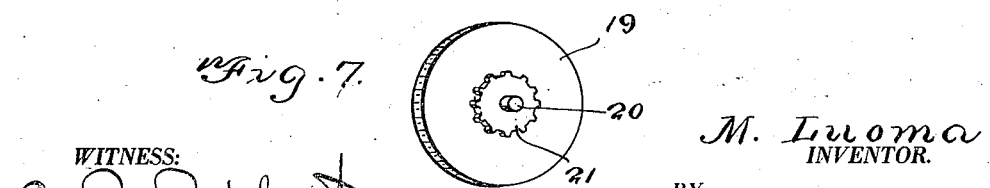

UNITED STATES PATENT OFFICE.

MATT LUOMA, OF ASTORIA, OREGON.

ANGLE-INDICATOR.

1,342,335.   Specification of Letters Patent.   Patented June 1, 1920.

Application filed July 3, 1919. Serial No. 308,574.

*To all whom it may concern:*

Be it known that I, MATT LUOMA, a citizen of Finland, residing at Astoria, in the county of Clatsop and State of Oregon, have invented new and useful Improvements in Angle-Indicators, of which the following is a specification.

This invention relates to measuring devices, particularly to angle indicators, and has for its object the provision of an instrument particularly adapted for use in the ship building art, whereby angles may be very quickly and easily ascertained.

An important object is the provision of a device of this character which will be simple and inexpensive in manufacture, which may be very easily adjusted for use, which will be efficient in service, and a general improvement in the art.

With the above and other objects and advantages in view, the invention consists in the details of construction to be hereinafter more fully described and claimed, and illustrated in the accompanying drawings, in which—

Figure 1 is a side elevation of the device in closed position,

Fig. 2 is a plan view thereof,

Fig. 3 is a cross sectional view taken through the pivoted end of the blade,

Fig. 4 is an elevation of the opposite side showing the movable blade in extended position, Fig. 5 is a cross sectional view through the device, the indicating wheel being in elevation, Fig. 6 is a side elevation with one side plate removed, and Fig. 7 is a detail view of the indicating wheel.

Referring more particularly to the drawings, the numeral 10 designates the body of my device which is of elongated formation and which is provided with a longitudinally extending recess 11 extending entirely to one end and which is also provided with a recess 12 adjacent the other end and separated from the recess 11 by a partition 13. Disposed upon one side of the body 10, preferably adjacent the recess 12, is a level 14 of ordinary construction, and the purpose of which is that the operator may ascertain when the body 10 is level so that the determination of angles by the means to be hereinafter described, may be accurate.

Pivoted within the recess 11 at the open end thereof, is a blade 15 which is adapted for disposition entirely within the recess 11 when its use is not desired. This blade is pivoted by means of a shaft 16 rigidly secured to the blade and journaled through the sides of the body. At one side of the blade the recess has communicating therewith a groove 17 within which is disposed a small toothed wheel 18 secured upon the shaft 16. Disposed within the recess 12 is a disk 19 having its periphery graduated in degrees. This disk is secured upon a shaft 20 which has its ends journaled through the sides of the body and secured upon this shaft is a small toothed wheel 21 which is disposed within the other end of the groove 17, it being noted that this groove extends longitudinally of the body. A chain 22 is trained about the toothed wheels 18 and 21. A small wire 23 is secured across the open side of the recess 12 and serves as an indicator coöperating with the graduations on the periphery of the disk.

In the use of the device, the body 10 is disposed upon one surface and the blade 15 is swung into engagement with an angularly extending surface, the angularity of which it is desired to determine. When the blade is thus moved, by virtue of the chain 22 and toothed wheels 18 and 21, the disk 19 will be partially rotated and the graduations on the periphery thereof registering with the indicating wire or the like 23 will indicate the angularity which it is desired to ascertain.

From the foregoing description and a study of the drawings, it will be apparent that I have thus provided a simple and inexpensive device by means of which angles may be quickly and easily determined in an efficient and accurate manner.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A device of the character described comprising an elongated body provided throughout its major portion with a longitudinal recess and provided at a point spaced from the closed end of said recess with a second recess, said body being provided at one side of said recesses with a longitudinally extending groove, a blade pivoted within the open end of said first named recess, a disk pivoted within said second named recess and having its periphery graduated in degrees, an indicator extending across the open edge of said second named recess and coöperating with the graduations on said disk, a toothed wheel rotatable with said blade and disposed within one end of said groove, a toothed wheel rotatable with said disk and disposed within the other end of said groove, and a chain extending through said groove and trained about both of said toothed wheels whereby upon movement of said blade said disk will be correspondingly moved.

In testimony whereof I affix my signature.

MATT LUOMA.